United States Patent [19]
Faylor et al.

[11] 3,870,033
[45] Mar. 11, 1975

[54] ULTRA PURE WATER PROCESS AND APPARATUS

[75] Inventors: Terry Lee Faylor, Santa Clara; Roger W. Martin, San Jose, both of Calif.

[73] Assignee: Aqua Media, Sunnyvale, Calif.

[22] Filed: Nov. 30, 1973

[21] Appl. No.: 420,703

[52] U.S. Cl............... 126/360 R, 165/163, 219/316
[51] Int. Cl.............................................. F24h 1/20
[58] Field of Search........ 126/360, 360 A; 219/316, 219/318, 319; 165/108, 163, 162

[56] References Cited
UNITED STATES PATENTS

| | | | |
|---|---|---|---|
| 2,087,586 | 7/1937 | Tishman | 219/316 X |
| 2,521,960 | 9/1950 | Arvintz et al. | 219/316 |
| 3,692,017 | 9/1972 | Glachant et al. | 126/360 A |
| 3,716,045 | 2/1973 | Vollhardt | 126/360 A |

Primary Examiner—Edward G. Favors
Attorney, Agent, or Firm—Owen, Wickersham & Erickson

[57] ABSTRACT

Deionized pretreated supply water is stored in a storage unit, and a part of the stored water is recirculated through a pure water recirculation loop. The recirculated water is polished in polishing demineralizers to an electrical resistivity at the circulating temperature equivalent to 18 megohm electrical resistivity at 25°C.

A proess portion of this polished water is heated to about 170°F. in a heat exchanger while retaining the 18 megohm equivalent resistivity and delivered to one point of use and then discarded from the recirculation loop. The remainder of the recirculating water is returned to storage, either directly if not used or after reclamation following use as process water.

The heat exchanger preserves the ultra pure quality of the water in the 18 megohm equivalent resistivity range by a technique of indirect heating in a coil of inert plastic tubing which is immersed in a body of liquid heated by an immersion heater.

The high velocity of the water in the recirculation loop prevents degradation of the quality of the water by minimizing the time of contact with the conduit structure of the recirculation loop.

The storage unit has sufficient capacity to make the flow balance substantially non-critical and to provide reserve capacity for the quantities needed for process use. The storage unit and the high quality deionized pretreated water permit the polishing demineralizers in the recirculation loop to be sized for flow rather than for capacity and also permit equipment in the pretreatment supply to be replaced or repaired without interruption of flow in the recirculation loop.

5 Claims, 6 Drawing Figures

ULTRA PURE WATER PROCESS AND APPARATUS

BACKGROUND OF THE INVENTION

This invention relates to a method and apparatus for producing ultra pure water in production quantities for industrial and commercial uses such as semiconductor manufacturing rinses, biomedical processes, and food processing, blending and cleaning applications.

This invention relates particularly to a method and apparatus for producing hot deionized water having a temperature of about 170° F. and a deionized purity equivalent to about 18 megohm electrical resistivity at 25° C.

Pure water is, simply, $H_2O$ without any contaminating materials. Pure water is such an excellent solvent that it has been speculated the preparation of water in its ultimate state has probably never been accomplished.

Because pure water is such an excellent solvent, water with a very high degree of purity (ultra pure water) makes an excellent rinse for removing the etching materials used in the manufacturing processes for making semiconductors and microcircuits.

In such rinsing processes the purity of the water needs to be of the highest quality. Active ions and solid particles in the rinse water can cause alteration of the current carrying characteristics of the semiconductors being rinsed through insulation breakdown, internal arcing and shorts (because of the extremely small size and close tolerances of such microscopic electronic circuits).

High purity water is also a necessity in many biomedical processes and in many food processing, blending and cleaning applications. The water used in biological processes, medical facilities and pharmaceutical manufacturing poses special purity requirements.

There are four classes of contaminants that appear in municipal water supplies. These four classes are (1) active ions, (2) solid particles, (3) micro-organisms, and (4) organic compounds.

One of the most commonly used techniques for measuring the total electrolyte content of ultra pure water is a measurement of electrical conductivity, or its reciprocal resistivity. It can be demonstrated by mathematical analysis that the theoretical resistivity in megohms-cm. for pure water is 18.3 megohms at a temperature of 25° C. Resistivity is a measurement which is relatively easy to make and is the most commonly used measure of water quality. 18 megohm water is therefore generally recognized as ultra pure water, so far as the removal of active ions are concerned.

Solid particles (inorganic and non-ionized) range from common sand to metal flakes and rust. These contaminants are removed by mechanical filtration processes, some of which have thin membranes with 0.1 micron pores. Ultra pure water, for many specifications, must have less than 150 of such particles per milliliter and of a nominal maximum size of 0.5 micron.

Water is a favorable growth medium to many bacteria and fungi. Such contaminants are removed by mechanical filtration, but most must be killed before removal. This is accomplished by antibacterial processes such as heat sterilization, ultraviolet irradiation, ozonation and chlorination. Ultra pure water specifications will often call for a bacteric plate count of less than five colonies per milliliter.

Organic compounds comprise long chain organic molecules released into water by the decay of vegetable and animal matter and from human sources such as detergents, pesticides and petrochemical derivatives. These organic compounds must often be removed from water for biomedical applications, pharmaceutical blending, and semiconductor fabrication. These contaminants are removed by super chlorination (with subsequent activated-carbon filtration), exposure to special organic-absorbent resins and reverse osmosis. Ultra pure water will have no more than one part per million of such organic compounds.

Ultra pure water must also be free or substantially free of dissolved gases. Such dissolved gases are removed by upflow columns, vacuum degasifiers and ion exchange.

Once ultra pure water is produced the problem of subsequent handling to retain the quality is immediately presented.

The ultra pure water is such a good solvent that it will attack the surface of almost any material with which it comes in contact. Thus, there are limitations on the purity of water which is in contact with glass or fiberglass because the water will attack such materials to produce dissolved active ions. This substantially reduces resistivity. Contact with distribution pumps, valves and fittings and atmospheres within the distribution system can also present substantial problems of degradation of the water quality.

SUMMARY OF THE INVENTION

It is a primary object of the present invention to produce ultra pure water to a temperature of about 170° F. while retaining a resistivity at the heated temperature equivalent to 18 megohm quality at 25° C. Such hot deionized water is particularly effective for use as a rinse in semiconductor fabrication because the hot deionized water is a ferocious solvent (and therefore is highly effective as a rinse); and the high temperature of the water causes rapid evaporation which minimizes the contact time of the rinse (and thus minimizes the chance of damage to the microcircuit because of the solvent action of the water itself).

It is a further object of the present invention to incorporate a storage unit in an ultra pure water recirculation loop in a way that provides a number of specific advantages over recirculation loops as used in the prior art.

In the present invention ultra pure water is produced in production quantities for industrial and commercial uses by a system which comprises a pretreatment or makeup part. The supply water is pretreated to a certain purity level of suspended materials and electrical resistance and is then delivered to a large capacity storage unit.

A part of the pretreated and stored water is continuously withdrawn from the storage unit and recirculated in an ultra pure water recirculation loop. This loop includes polishing demineralizers for polishing the recirculated water to a deionized resistivity level, at the recirculating temperature, equivalent to 18 megohm electrical resistivity at 25° C.

A part of the polished water is then delivered as process water to one or more points of use and the remainder is returned to the storage unit.

A heat exchanger is located closely adjacent one of the points of use for heating the part of the process water going to that point of use. The heat exchanger is constructed in a way to heat the ultra pure deionized water to a temperature of about 170° F. without degrading the quality of the water. That is, the heated water at the outlet of the heat exchanger has a deionized purity which is equivalent to an 18 megohm resistivity of water at 25° C. The heat exchanger achieves this result by using an indirect method of heating. A large number of very small diameter coiled tubes of inert Teflon fluorocarbon plastic are immersed in water which is heated by an immersion heater. The high purity water is circulated within the coils, and the heat is transferred to the high purity water through the sidewalls of the tubing.

The high purity water is also continuously recirculated through the recirculation loop and at high velocity to minimize the time of contact of the polished water with the conduit structure. This technique minimizes the opportunity for contamination of the ultra high purity water after it has been demineralized by the polishing demineralizers in the recirculation loop.

The way in which the large capacity storage unit is associated with the pretreatment part of the system and the ultra high purity recirculation loop provides a number of significant advantages. The pretreatment part of the system is constructed to supply water of at least one megohm purity to the storage unit, and the storage unit is constructed to retain at least this level of purity. The storage unit is constructed to store a substantially larger volume of water than that required to maintain flow in the recirculation loop and at the points of use.

This combination of relatively high purity and relatively large volume of stored pretreated water makes the flow balance substantially noncritical and provides reserve capacity for peak quantities needed for process use. The various pieces of equipment for the pretreatment part of the system, and in particular the deionizers, can therefore be constructed as portable, readily replaceable units and can be removed (for replacement or repair) from the pretreatment part of the system for a period of time without interrupting flow through the high purity recirculation loop.

The polishing demineralizer in the ultra pure water recirculation loop can also be sized for flow, rather than capacity, because of the water supplied from the storage unit has a relatively low concentration of ions to be removed. The polishing demineralizer is made of a nuclear grade, very pure ion exchange resin to produce complete or substantially complete deionization. Because the stored water supplied to the polishing demineralizer is already low in ions, the demineralizer requires replacement and/or regeneration only at relatively infrequent intervals and yet permits high velocity flow rates to minimize conduit contamination as noted above.

By locating the heat exchanger after the polishing demineralizers, it is possible to produce water which is not only ultra pure but also heated to elevated temperatures. This sequence of demineralizing and then heating is important because it is virtually impossible to demineralize water after it is heated to an elevated temperature such as 170° F.

The hot deionized water is an important part of the present invention because ultra pure water heated to 170° (and having an electrical resistivity at that temperature equivalent to 18 megohms at 25° C.) is a ferocious solvent which is particularly effective in removing the etchants used in semiconductor fabrication processes. The hot deionized water is not only a much more effective solvent than unheated deionized water of the same equivalent deionization, but the hot deionized water also has the further advantage that it evaporates quicker to minimize the time of contact with the material being rinsed. This minimizes the possibility of the rinse itself producing solvent damage to the product.

In the present invention part of the water in the recirculation loop is withdrawn for process use without heating. In many cases the waste water from the process is only slightly contaminated, and is practical to reclaim. The present invention includes a reclamation circuit for reclaiming such process water after use. This circuit restores the reclaimed water to a purity level that is at least as great as that of the pretreated supply water delivered to the storage unit. This reclaimed water is returned directly to the storage unit and provides a significant cost saving by minimizing the make-up water that must be pretreated through the pretreatment part of the system.

The present invention includes a back pressure regulator valve which is located in the recirculation loop between the last outlet for process water delivered to a point of use and the storage tank. The back pressure regulator valve maintains a preselected minimum pressure at this point in the recirculation loop so that sufficient pressure is always supplied to the most downstream outlet regardless of the number of upstream outlets that are cut into or out of the recirculation loop at any particular point in time.

Water purification apparatus and methods which incorporate the structure and techniques described above and which are effective to function as described above constitute specific objects of this invention.

Other objects, advantages and features of our invention will become apparent from the following detailed description of one preferred embodiment taken with the accompanying drawings.

DETAILED DESCRIPTION OF THE PREFERRED EMBODIMENTS

Figure 2:
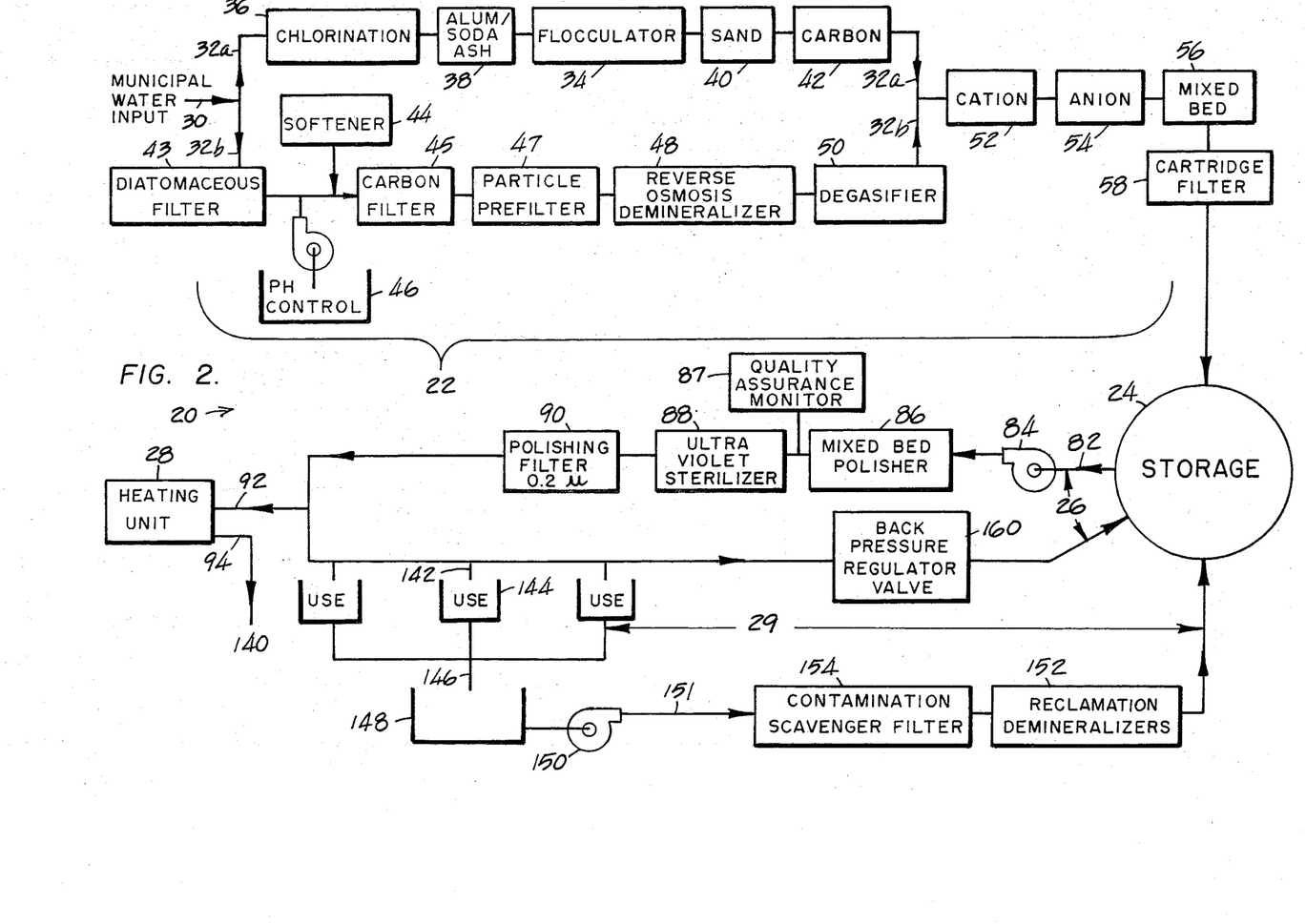
FIG. 2 is a schematic flow diagram of a system for producing ultra pure water in production quantities for industrial and commercial uses and constructed in accordance with one embodiment of the present invention.
Figure 3:
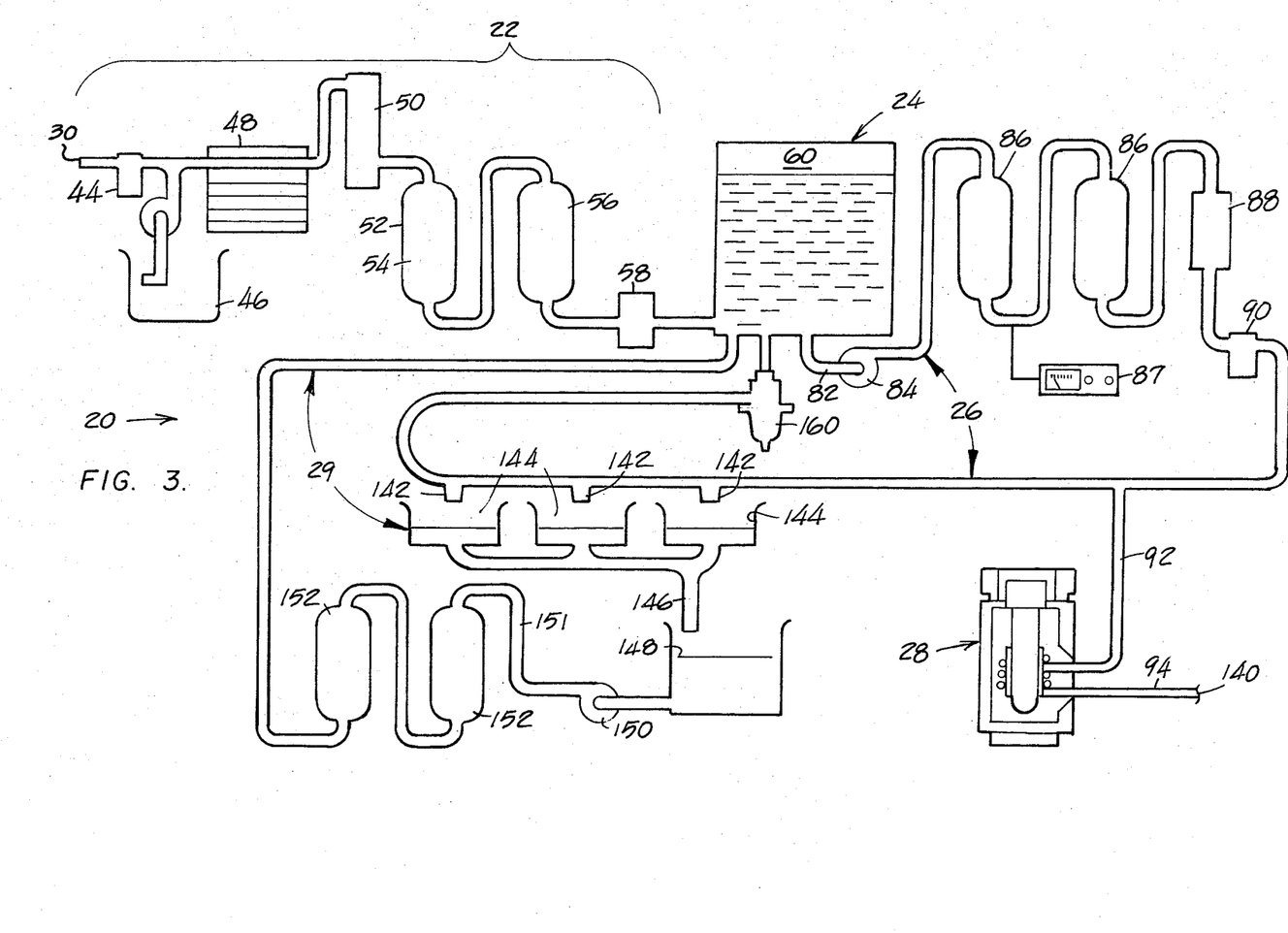
FIG. 3 is a pictorial view showing additional details of the system illustrated in FIG. 2.

A water purification system constructed in accordance with one embodiment of the present invention is indicated generally by the reference numeral 20 in FIGS. 2 and 3.

The system 20 includes a pretreatment part 22, a large capacity storage tank 24 and an ultra pure water recirculation loop 26.

The system 20 includes a heat exchanger 28 for heating part of the water circulating in the recirculation loop 26 to an elevated temperature just prior to delivery to a point of use, such as for a rinse in a semiconductor fabrication process.

The system 20 also includes a reclamation circuit 29 for reclaiming process water after such process water has been withdrawn from the recirculation loop 26 at one or more points of use. The circuit 29 returns the reclaimed process water to the storage tank 24.

The system 20 shown in FIGS. 2 and 3 is used for rinse operations in semiconductor fabrication processing.

The system 20 provides the very high quality deionized water that is required for such rinse operations. It also produces hot deionized water which is particularly effective for certain of the rinse operations.

The system incorporates a large capacity storage tank between the pretreatment part 22 and the recirculation loop 26 in a way that makes flow balances substantially noncritical and provides reserve capacity for quantities needed for peak process use. The storage tank makes it feasible to use portable units, particularly in the pretreatment part 22, because the storage tank provides enough reserve capacity to permit replacement of the pretreatment portable units without interruption of flow in the recirculation loop 26.

The system 20 also provides certain economies of operation because of the way the large capacity storage tank is combined with the pretreatment part 22 and the recirculation loop 26 and also because of the way in which the reclamation circuit 29 reduces the amount of makeup water that must be supplied by the pretreatment part 22.

These features will become more apparent from the description to follow.

The pretreatment part 22 takes the water from the municipal water input 30 and treats this supply water to remove a certain amount of the active ions and suspended materials before delivering the pretreated water to the storage tank 24.

In the specific embodiment of the present invention the pretreatment part 22 deionizes the supply water to a resistivity equivalent to a minimum of at least one megohm at 25 degrees C. before delivering the water to the storage tank 24.

As illustrated in FIG. 2, the pretreatment part 22 can have one of two alternate initial flow paths 32a or 32b.

The flow path 32a has a flocculator 34 preceded by a chlorine unit 36 which oxidizes organics and sterilizes bacteria and an alum/soda ash feeder 38. The flocculator 34 precipitates impurities (primarily silica and organics). A sand filter 40 takes out the carryover from the flocculator 34 and a carbon filter 42 removes excess chlorine (and to a limited degree some organics).

In place of the flow path 32a a flow path 32b which may have a diatomaceous earth prefilter 43, a softener 44, a carbon filter 45, a pH control unit 46, a particle prefilter 47, a reverse osmosis demineralizer 48, and in some cases a degasifier 50 for the removal of $CO_2$ may be used. Such reverse osmosis units incorporate semipermeable membranes and like the other structures in the pretreatment part 22 are standard constructions which are commercially available as off the shelf items.

From the outlet of the flow path 32a or the flow path 32b the supply water flows to a cation ion exchanger 52. The cation exchanger removes metallic ions such as calcium, magnesium, etc.

An anion ion exchanger 54 is connected downstream of the cation exchanger 52 to remove sulfates, chlorides and silica.

A mixed bed ion exchanger 56 then removes both cations and anions but to a higher quality than the exchangers 52 and 54. These ion exchangers have a certain capacity to remove ionic impurities from the water. Thus the units must be replaced or regenerated periodically.

It is a feature of the present invention that these ion exchange units can be constructed as portable units and readily replaced without interruption to the flow in the recirculation loop 26, as will be described in greater detail below.

A cartridge filter 58 which may be a string wound type is located downstream of the ion exchangers to prevent resin from such exchangers from getting into the storage tank 24. This is particularly important if one of the ion exchangers leaks excessively or should break.

The pretreatment part 22 sequences the removal of impurities and demineralization to protect the ion exchange materials in the exchangers 52, 54 and 56 from the accumulation of organic metal oxides and silica.

The storage unit 24 is a large capacity tank and is lined with the best quality fiberglass available. The storage tank 24 maintains the water at a resistivity equivalent to about 1 megohm at 25° C.

An inert nitrogen blanket 60 (see FIG. 3) is maintained in the top of the storage tank.

From the outlet of the storage tank and throughout the recirculation loop 26 the present invention is particularly directed toward reducing impurities to the lowest possible level, consistent with economic necessities.

Inert plastic materials are used to the extent possible for the recirculation loop 26.

A polyvinyl chloride (PVC) plastic pipe 82 is connected to the outlet of the storage tank and to one or more distribution pumps 84. The pumps 84 are preferably made of stainless steel.

The distribution pump 84 provides for a high velocity flow through the recirculation loop 26 (to minimize time for conduit contamination) and pumps the recirculated water to polishing demineralizers 86.

These demineralizers contain nuclear grade, very pure ion exchange resin having a very limited amount of manufacturing impurities. The polishing demineralizers are mixed bed polishers which remove both cation and anion ions and produce water having a resistivity at the circulating temperature equivalent to 18 megohm at 25° C.

A quality assurance monitor 87 is connected downstream of the polishing demineralizers 86 to insure that the water quality is maintained at the resistivity level specified. By way of example, specifications for semiconductor fabrication process use commonly require 18 megohm equivalent resistivity 95 percent of the time with a 16 megohm cutoff.

Because the 18 megohm equivalent water is so pure, it is an excellent solvent, and the subsequent handling of the water presents definite problems in maintaining the high quality.

The high purity in terms of resistivity is of course not the only requirement. The water for process use must also be free or substantially free of other nonionized dissolved material.

The water downstream of the polishing demineralizers 86 is irradiated with an ultraviolet light 88 to sterilize the water and is subjected to a final filtration through one or more 0.2 micron filters 90.

A part of the polished water is withdrawn from the recirculation loop 26 downstream of the polishing filter 90 and conducted through a conduit 92 to the heat exchanger 28.

The heat exchanger 28 raises the temperature of the 18 megohm equivalent water to about 170° F. without degrading the quality of the water so taht the hot deionized water at the outlet 94 of the heat exchanger not only has a temperature of about 170° F. but also has an electrical resistivity at the 170° F. temperature equivalent to 18 megohm resistivity at 25° F. This hot deionized water is a ferocious solvent. It is particularly effective in rinsing etching materials from microelectronic circuits because of its high solvent action and also because of the fact that the high temperature of the water causes it to evaporate quickly to minimize the possibility of solvent damage to the circuit itself.

The heating to a high temperatue while retaining the high purity is accomplished by a method of indirectly heating small diameter coiled tubes of inert Teflon fluorocarbon plastic as will now be described.

Figure 4:
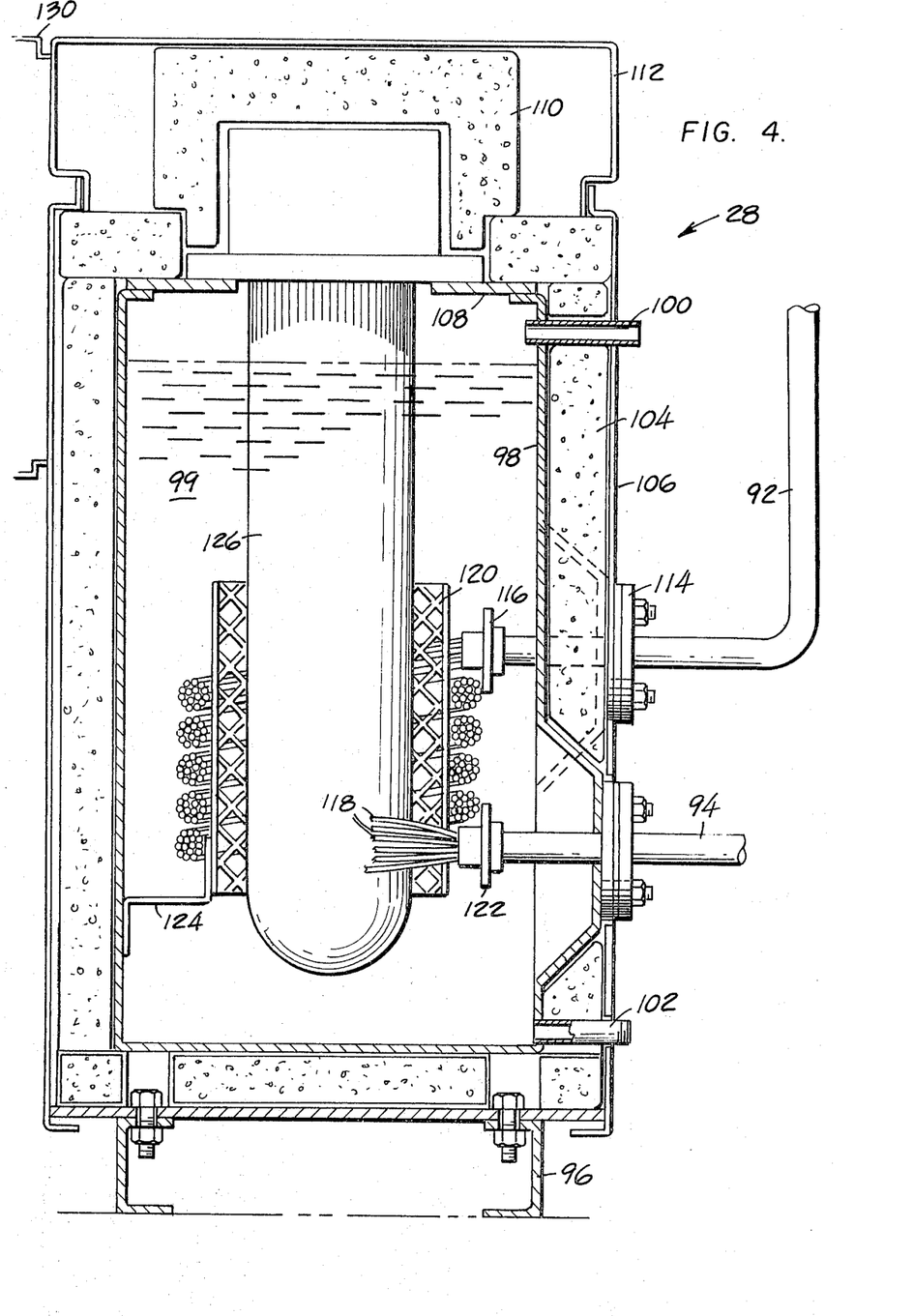
FIG. 4 is an elevation view in cross section through the heat exchanger shown in FIG. 1 and illustrates how an immersion heater is used in a tank of water to provide indirect heating of ultra pure water circulating within coiled tubes of inert plastic.

Details of the heat exchanger 28 are best shown in FIG. 4.

The heat exchanger 28 is mounted on a base stand 96 and comprises an inner tank 98 filled with water 99 to a level as indicated in the drawing. A vent 100 and a drain 102 extend through the sidewall of the tank 98, and the tank 98 is enclosed in rigid insulation 104 sandwiched between the tank and outside housing panels 106. The tank 98 has a tank cover 108 and an insulating cap comprising rigid insulation 110 and a top cover 112. The inlet conduit 92 is connected to the tank by a flanged connection 114, and the outlet conduit 94 is connected by a similar flanged connection. The flanged connection 114 is connected to an inlet fitting 116 which in turn is connected to the inlet ends of a plurality of plastic tubes 118.

Each tube 118 is a small diameter tube of inert plastic material. In a particular embodiment of the present invention each tube has an OD of 0.10 inch and an ID of 0.08 inch and is made of Teflon fluorocarbon plastic.

The fitting 116 is preferably made of pacivated stainless steel.

The individual tubes 118 are preferably braided in concentric layers to form a super coil that is cylindrical in shape as shown in the cross-sections of FIG. 4. These tubes are then coiled about the outer surface of a basket carrier 120.

The outlet ends of the tubes 118 are connected to an outlet fitting 122 which is in turn connected to the outlet conduit 94.

The basket or support member 120 is mounted inside the tank 98 by a plurality of Z-shaped hangers 124, and the entire arrangement is such that the coiled tubes 118 are easily accessible from the top of the tank.

An immersion heater 126 is disposed centrally within the interior of the carrier or basket 120. This immersion heater heats the water 99 in the tank to the temperature required for conducting sufficient heat through the sidewalls of the tubes 118 to bring the process water within the tubes up to the 170° F. temperature at a selected flow rate.

A thermostatic probe is disposed within the water 99 to regulate the energization of the immersion heater 126.

Figure 1:
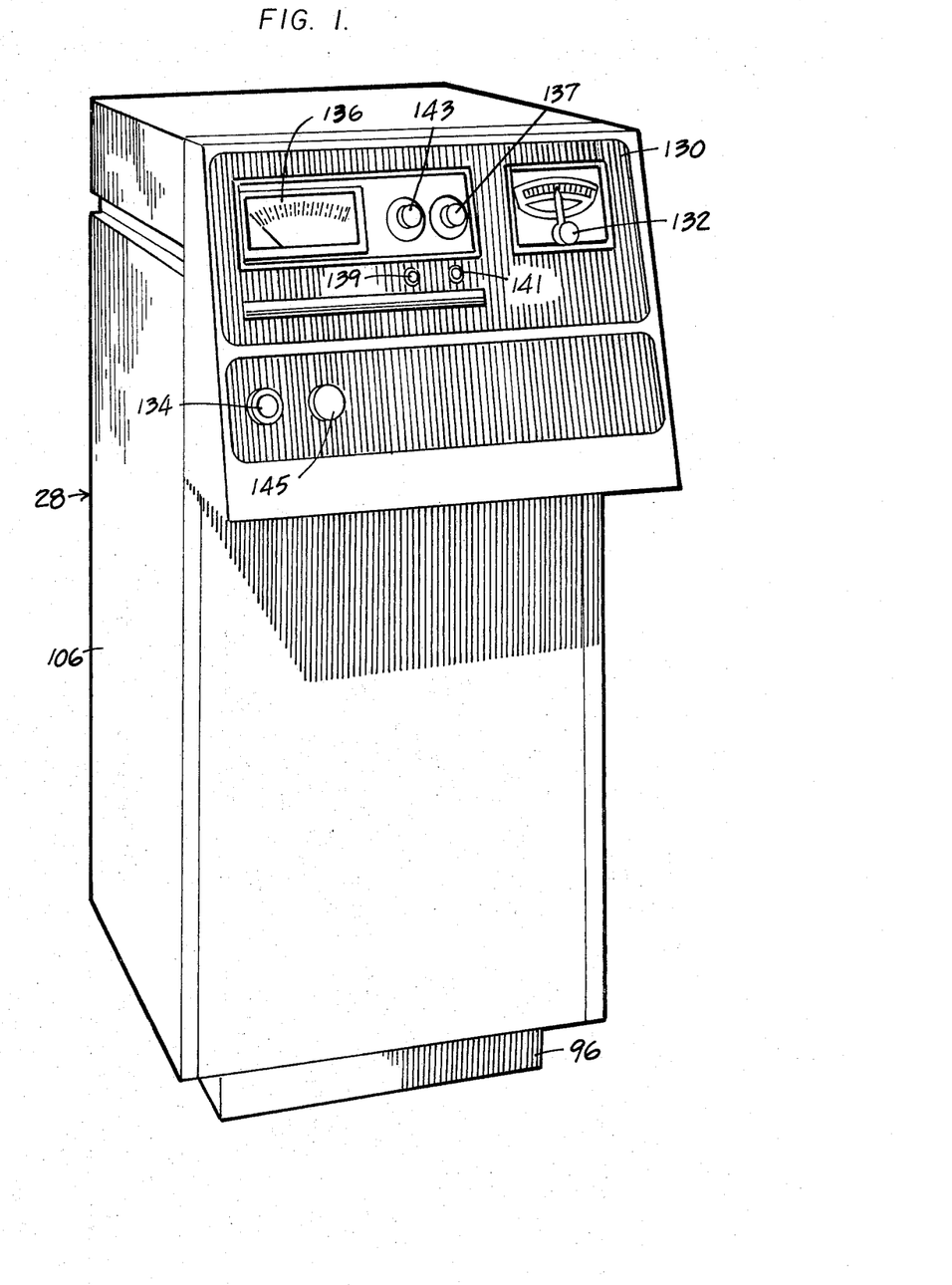
FIG. 1 is an isometric view of an outer cabinet for a heat exchanger constructed in accordance with one embodiment of the present invention.

A control pod and chassis 130 (best shown in FIG. 1) are mounted on the top part of the heat exchanger 28. A control dial 132 controls the temperature set point for the hot deionized water. An indicator light 134 indicates whether the heat exchanger is on or off. A resistivity indicator dial 136 displays the electrical resistivity of the water flowing out of the heat exchanger 28. A setting adjustment knob 137 on the front panel controls the operation of a built-in double pole, double throw enclosed relay which may be used to operate diverter valves, remote lights or other controls. Red and amber neon lights 139 and 141 on the front panel continuously show whether water quality is above or below the setting. A function knob 143 provides highly accurate specific resistivity reading over three temperature compensated linear ranges, 0–20, 0–2 and 0–2 megohm-cm. A rotary probe selector switch 145 permits the operator to manually check the resistivity of the process water at the inlet or the outlet.

The outlet conduit 94 is preferably kept as short as possible by locating the heat exchanger 28 close to the point of use 140. This minimizes the opportunity for degradation of the purity of the hot deionized water by contact with the conduit structure.

Due to the fact that the amount of impurities picked up in the hot rinse operation at the point of use 140 are usually slight, it is usually feasible to reclaim this water for return to the storage tank 24.

The reclamation circuit 29 described in more detail below is an important feature of the present invention because it serves multiple purposes. It reduces the amount of pretreated make-up supply water that must be prepared and reduces the amount of waste post treatment while at the same time it makes the flow balance of the entire system less critical. It also saves the user significant cost.

The ultra pure water in the recirculation loop 26 is conducted to one or more outlets 142. As illustrated in FIG. 3, the water from these outlets is used for rinse operations at points of use 144.

In many semiconductor fabrication processes, the use of deionized water for rinse operations slightly contaminates the process water to an extent that the water can be profitably reclaimed.

In the present invention a conduit 146 collects the used process water and conducts it to a tank 148 from which it is pumped by a pump 150 through a conduit 151 to reclamation demineralizers 152. In some cases this is the only processing required to reclaim the process water, and it is then returned directly to the storage tank 24. In other cases, depending upon the specific use to which the process water has been put, it may be necessary to use additional equipment to reclaim the process water.

Figures 5, 6:
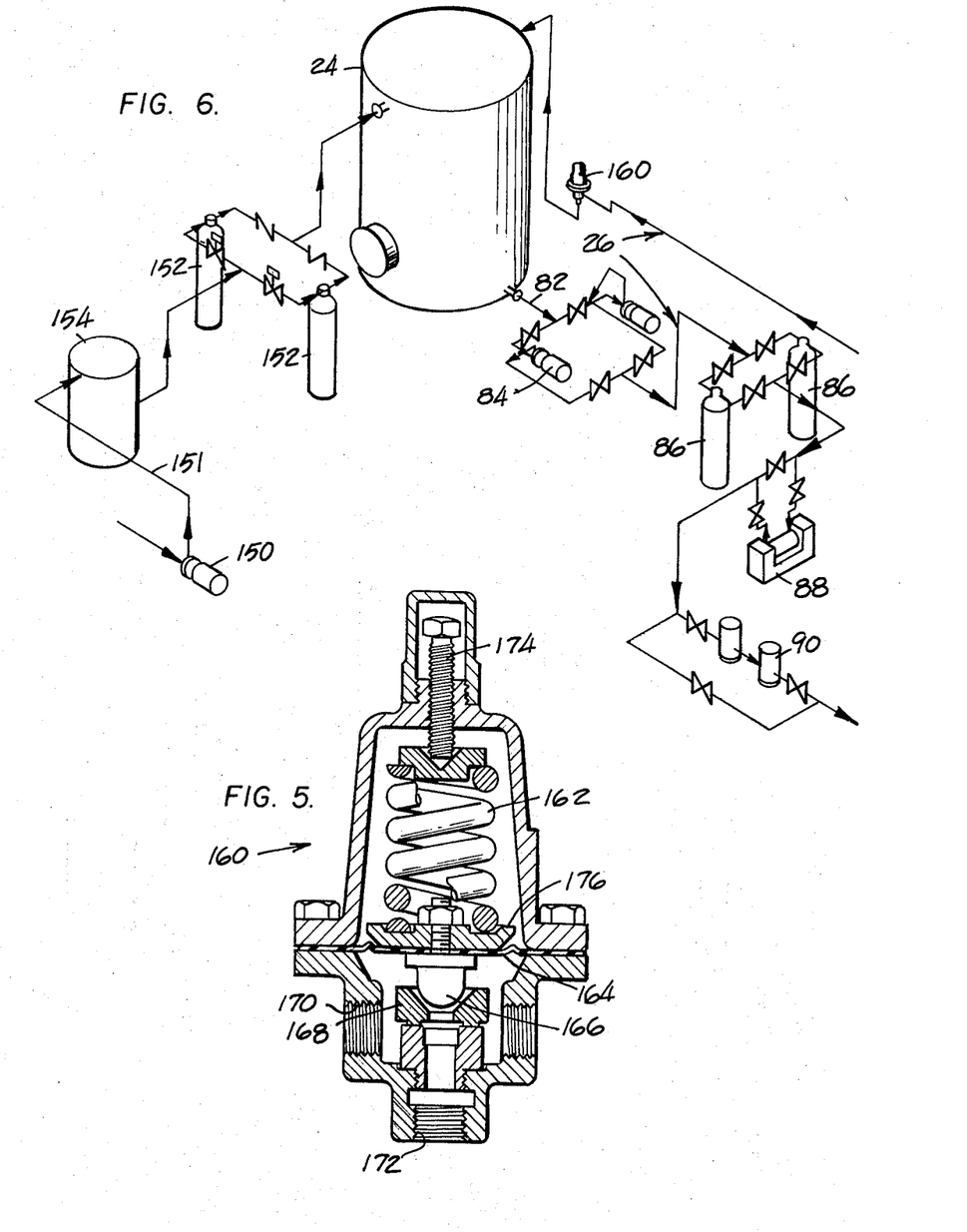
FIG. 5 is a side elevation view in cross section of a back pressure regulator valve used in the recirculation loop of the system shown in FIGS. 2 and 3.
FIG. 6 is an isometric view showing how an electrodialysis unit is incorporated in a reclamation circuit in accordance with one embodiment of the present invention.

As illustrated in FIG. 6 a contamination scavenger filter 154 is interposed in the conduit 151 between the pump 150 and the demineralizers 152.

The outlets for the various points of use are, of course, opened and closed in response to the particular need for the ultra pure water at such points of use. Depending upon the process operations being carried on at the various points of use, a substantial number of such outlets may be opened at any one particular time. The pressure at the most downstream point of use must at all times be sufficient to maintain a preselected flow rate regardless of the number of preceding outlets which are open in the ultra pure water recirculation loop 26.

The present invention provides a back pressure regulator valve 160 located in the loop 26 between the last outlet 142 and the storage tank 24 to maintain the required pressure.

This valve is shown in detail of FIG. 5 and includes a biasing spring 162 and a flexible diaphragm 164 for positioning a movable valve element 166 with respect to a fixed valve seat 168. Proper positioning of the valve element 166 maintains a preselected minimum back pressure at the inlet 170 of the valve, and thus in the part of the conduit 26 downstream of the last outlet 142. The outlet 172 of the valve 160 is connected to the storage tank 24.

In the operation of the back pressure regulator valve 160, an adjustable screw 174 sets the desired spring force on the washer 176 engaged with the upper side of the diaphragm 164. The fluid pressure from the inlet conduit 170 then acts on the lower side of the diaphragm 164 in opposition to the preselected spring force. As the fluid pressure tends to drop with an increase in the openings of the outlets 142, the spring force moves the valve element 166 downward to restrict flow and to thereby maintain the preselected minimum fluid pressure at the inlet 170 of the valve and thus the recirculation loop 26.

The present invention thus provides a water purification system which is effective to produce ultra pure water in production quantities for industrial and commercial uses. It combines a large capacity storage tank with a pretreatment circuit and an ultra pure water recirculation loop in a way that has a number of significant advantages. The present invention also produces hot deionized water which retains after heating a deionized purity equivalent to a resistivity of 18 megohms at 25° C. This hot deionized water is a ferocious solvent which is highly effective for semiconductor fabrication rinse operations. The present invention also includes a reclamation circuit which combines with the storage tank and with the recirculation loop in a way to minimize costs and to make flow balances even less dependent on the supply of pretreated make-up water.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A heat exchanger system for producing hot, deionized water and comprising, inlet supply means for supplying water deionized to an electrical resistivity at the supply temperature equivalent to a resistivity in the range of 16–18 megohms for water at 25° C., heat exchanger means for heating said deionized water to a temperature in the range of 160°–190° F. while retaining said electrical resistivity at the heated temperature equivalent to 15–18 megohms at 25° C., and outlet means for conducting the hot (160–190° F.) deionized (15–18 megohms equivalent) water from the heat exchanger means to a point of use.

2. The invention defined in claim 1 wherein the heat exchanger means include a tank at least partially filled with liquid, a coiled tube of inert plastic tubing immersed in the liquid in the tank and having an inlet connected to the inlet supply means and having an outlet connected to the outlet means, and a heating element disposed within and spaced from the coil for direct heating of the liquid in the tank and for indirect heating of the deionized water in the interior of the tubing.

3. The invention defined in claim 2 wherein the tubing comprises a bundle of parallel flow small diameter coiled tubes of Teflon fluorocarbon plastic.

4. The invention defined in claim 2 wherein the tubing is wound in a plurality of coils and including a support member for supporting the coils and for maintaining the spacing between the coils and the immersion heater.

5. The invention defined in claim 4 wherein the support member is mounted in the tank to provide ready access to the coils.

* * * * *